United States Patent [19]

Pekar et al.

[11] Patent Number: 4,849,264

[45] Date of Patent: Jul. 18, 1989

[54] FRICTION REDUCING COATING FOR METAL SURFACES

[75] Inventors: Howard G. Pekar, Mentor; Edmund W. Kinkelaar, Dublin, both of Ohio; Gerald T. Gira, Lathrup Village, Mich.

[73] Assignee: Texo Corporation, Cincinnati, Ohio

[21] Appl. No.: 161,770

[22] Filed: Feb. 29, 1988

Related U.S. Application Data

[63] Continuation of Ser. No. 815,637, Jan. 2, 1986, Pat. No. 4,737,385.

[51] Int. Cl.[4] .......................... B05D 5/08; B05D 1/34; C09D 5/00; C23F 11/00

[52] U.S. Cl. .............................. 427/388.1; 427/385.5; 427/387; 427/388.4; 427/388.5; 524/310; 524/313; 524/481

[58] Field of Search ............... 524/310, 313, 481, 482, 524/483, 484, 485, 486, 490, 491; 427/388.5, 386, 387, 385.5, 388.4, 388.1

[56] References Cited

U.S. PATENT DOCUMENTS

| | | | |
|---|---|---|---|
| 3,033,808 | 1/1959 | Murray et al. | 524/313 |
| 3,438,920 | 4/1969 | Halper et al. | 524/484 |
| 3,669,728 | 6/1972 | Seiner | 524/294 |
| 4,284,518 | 8/1981 | Reick | 252/16 |
| 4,284,668 | 8/1981 | Nixon | 428/450 |

*Primary Examiner*—Paul R. Michl
*Assistant Examiner*—Mark R. Buscher
*Attorney, Agent, or Firm*—Francis T. Kremblas, Jr.

[57] ABSTRACT

A coating composition for application to a metal part, which improves corrosion resistance and significantly reduces the co-efficient of friction of the surface of the part and a one coating step method for applying the coating to form two distinct layers on the coated part. The composition includes an oil phase in which polytetrafluoroethelene particles are suspended mixed with a resin film forming paint composition. Upon applying the coating to the part and curing of the resin film, the oil phase separates and forms a overlayer of oil having the polytetrafluoroethelene particles uniformly distributed in the oil layer.

9 Claims, No Drawings

FRICTION REDUCING COATING FOR METAL SURFACES

This application is a continuation in part of Serial No. 815,637 filed 1-2-86, now U.S. Pat. No. 4,737,385.

BACKGROUND OF THE INVENTION

The present invention relates generally to coating formulations and methods of application of the same for rendering metallic parts corrosion resistant. Specifically, the present invention relates to a novel method and coating composition wherein a two-phase formulation containing a separate paint phase and a separate oil phase are simultaneously applied to the metal part in one step to provide improved resistance to corrosion.

Prior to the present invention, the conventional corrosion resistance treatment consisted of the steps of a conventional and well-known phosphating treatment of the metal part, followed by a painting step to apply a paint coating. After appropriate baking or drying of the paint coat, the metal part is immersed in an oil formulation to apply a coat of oil over the paint undercoat. Such treated metal parts must meet certain industry standards, such as set by the automotive industry for example, relating to corrosion resistance in salt spray tests to be suitable for use.

The standard test generally employed in a salt spray corrosion test is ASTM Method B 117 wherein the treated metal part is exposed to a salt spray atmosphere for a predetermined time. Metal parts treated in the prior art manner have shown reasonably acceptable degrees of corrosion resistance pursuant to industry standard salt spray tests, although in many instances two coats of paint followed by a coat of oil are required to assure the metal parts satisfactorily meet the minimum requirements.

U.S. Pat. No. 4,165,242 discloses a general description of prior art processes for treating phosphated metal parts to improve corrosion resistance utilizing the general steps of applying a paint coat and then an oil coat in separate steps and includes descriptions of some of the paint and oil formulations useful in such processes as is well-known to those skilled in the art.

However, prior to the present invention, there has been no formulation or method which consistently provides salt spray corrosion resistance equal to or exceeding automotive industry standards for painted parts without employing both a paint coating and a separate oil coating step.

Prior attempts to use an oil coupled into the paint vehicle gave limited corrosion resistance which did not acceptably meet industry standards. Therefore, prior to the present invention, the conventional paint undercoat and oil overcoat were applied in either a two or three step process.

The three step process referred to above involves a process wherein a large number of small parts are treated in a batch method. Two separate painting steps are employed wherein a first paint coat is applied to the parts. Then the paint step is repeated prior to application of the oil coat. This additional paint coat step is often required because of the tendency for the newly painted parts to adhere to one another during the baking step. After the parts are baked, any parts adhered to one another must be physically separated. However, often the paint coat is also pulled away from one of the parts at the point of engagement, resulting in exposing an unpainted surface area. To combat this problem, a second painting step is employed which tends to assure coverage of most of these exposed surfaces. Without this second painting step, the percentage of failed parts is often too high to acceptably meet automotive specifications for corrosion resistance.

SUMMARY OF THE INVENTION

The present invention relates to a novel and improved method of treating metal parts and a novel oil and paint coating formulation for use in the method to provide improved corrosion resistance in a more efficient manner.

The novel method and coating formulation provides a combined paint and oil formulation which is applied in a single coating step in place of the two or three steps used in the prior art process. The novel formulation in accordance with the present invention comprises a di-phase composition of a conventional paint composition and an oil component which will not form a solution or stable emulsion with the paint.

The one step coating method in accordance with the present invention involves coating the metal parts with the composition of the present invention when the composition is in a dispersed state wherein the oil component is thoroughly dispersed throughout the paint but retains its character as a separate phase from the paint.

After the coating has been applied in this manner, it is baked to cure the paint coat. This procedure results in the paint coat being deposited against the metal surface and the oil component rising to the surface of the paint coat.

Salt spray tests in accordance with industry standards have shown that the one step coating process of the present invention, in the most preferred embodiment, provides up to two to three times better results in salt spray corrosion resistance tests compared to the prior art while eliminating at least one costly and time consuming step from the processing of such parts.

Tests indicate that the formulation and method of the present invention works well using conventional well-known paint compositions and commercially available oil formulations and that many combinations of various resin film forming paints and oils may be formulated to meet the requirements of a given application. However, the formulation must remain an essentially di-phase composition wherein the oil component does not solubilize or become a stable emulsion in the paint vehicle.

OBJECTS

It is therefore a primary object to provide a novel formulation and method for a single step coating application for treating metal parts for corrosion resistance to salt spray.

It is another object of the present invention to provide a paint-oil formulation and method as described wherein the treated metal parts equal or exceed the corrosion resistance of metal parts processed by the prior art multiple step processes of applying a paint coat and an oil coat to the parts in separate and distinct steps.

It is another object of the present invention to provide a novel paint-oil formulation wherein the oil is finely dispersed within the paint to form a temporary suspension therein without being solubilized or forming a stable emulsion with the paint vehicle.

It is a further object of the present invention to provide a method of applying both a paint and an oil coating to metal parts in a one step application wherein the paint will be deposited upon the surface of the metal part and the oil component separates to be deposited upon the surface of paint coat.

It is yet another object of the present invention to provide a novel and improved formulation and method of treating metal parts for corrosion resistance in a salt spray atmosphere wherein the adherence of the coated metal parts to one another, such as occurred in the prior art process, is essentially eliminated.

Further objects and advantages of the present invention will be apparent from the following description, reference being had to the accompanying examples wherein preferred forms of embodiments of the invention are clearly described.

DETAILED DESCRIPTION

In accordance with the present invention, the novel paint-oil composition generally comprises a conventional paint and an oil component which is not coupled into solution in the paint nor which forms a stable emulsion with the paint. Typical conventional paint formulations used for applying paint coats to metal parts for corrosion resistance are useful in the present invention and include those resin film formers such as the epoxy-ester, alkyd melamine, melamine, acrylic and baking enamel types, for example.

The oil component of the di-phase coating composition of the present invention may comprises one of the typical, well-known long chain aliphatic or cycloaliphatic oils used for corrosion resistant coating in prior conventional methods, such as for example, castor oil, tung oil, linseed oil, mineral oil, naphthenic oils, etc. Also included are the water-displacing, rust inhibiting parafinic oils which are hydrophobic in character. These are typically commercially available products and are presently used for oil coating in the prior art corrosion resistance processing. The first mentioned type comprise aqueous solutions or emulsions of the oils which contain stabilizers, emulsifying agents, and other additives. Typical products of this nature are available under various trademarks and tradenames, such as NAPREX from Mobil Oil and TECTYL from Ashland Petroleum Company, for example. A typical water-displacing oil commercially available from Texo Corporation under the trademark GLOBRITE 364 is an example of the second mentioned type of parafinic oil.

The water soluble or emulsifiable oils can be enhanced in their ability to provide salt spray corrosion resistance in a manner such as described in U.S. Pat. No. 4,440,582 by suitable compositions which include siloxanes. The disclosures contained therein are hereby incorporated by reference. One of the preferred oil components for use in accordance with the present invention are compositions including one of the above-described oils with siloxanes such as described in U.S. Pat. No. 4,440,582. One such patent is commercially available from Ashland Petroleum Company under the trademark TECTYL 603. Another preferred oil formulation for use in accordance with the present invention is a non-aqueous solution of a parafinic oil with a siloxane formulated such as described in Example V which follows later herein.

The siloxanes, as known to those skilled in the prior art to which the invention pertains, are generally prepared by the condensation of silanes to form the characteristic (Si—O—Si) bond. Siloxanes which are useful in the present invention are disclosed in detail in U.S. Pat. No. 4,440,582 and include the polyalkylsiloxanes and the alkylpolysiloxanes as well as mixtures thereof. The preferred siloxanes disclosed therein are polyalkylsiloxanes wherein the alkyl radical has about one to four carbon atoms and mixtures thereof.

The most preferred siloxanes are the aminofunctional polyalkylsiloxanes. These are commercially available products such as those sold by Dow Corning under the names DOW CORNING 531 and DOW CORNING 536. Also these aminofunctional polysiloxanes can be enhanced relative to corrosion resistance properties by reaction with a fatty acid. The preferred acid reaction used is the siloxane reacted with a fatty acid such as an isostearic acid or an oleic acid, for example.

The paint/oil composition of the present invention will form two separate phases easily visible as layers under static conditions. Mixtures thereof may range from about 50% to 90% by volume of the paint component and 10% to 50% by volume of the oil component. A preferred composition comprises 50% to 70% of the paint and 30% to 50% of the oil component on a volume basis.

The important factor in accordance with the present invention is to assure that the oil and paint components are not soluble in one another nor form a stable emulsion within one another. However, the two separate phases must be sufficiently dispersed within one another to form a temporary suspension of the two phases when applied to the metal part to obtain good results in the context of the present invention. For example, such a temporary suspension as contemplated for use in the present invention will separate upon standing in ambient conditions in about 1 to 24 hours to form two distinct layered phases.

The surprising discovery in accordance with the present invention relates to the necessary di-phase or two phases formulation, which when applied to the metal part in a dispersed form but retaining their separate characteristics, will separate from one another during the drying or baking step to form two distinct coatings. The paint coat adheres to the metal surface and the oil coat essentially is distributed over the surface of the paint coat.

If the oil component becomes an integral part of the paint vehicle such as not to form a separate phase, the parts do not exhibit the high degree of corrosion resistance in accordance with the present invention.

The di-phase composition of the present invention may be advantageously applied by a conventional and well-known dip spin method although other well-known conventional application techniques may be used without departing from the spirit of the present invention.

It has been found that the best results are obtained by properly preparing the parts by the well-known conventional cleaning, and phosphating steps typically employed in the treatment for salt spray corrosion resistance.

During application of the paint-oil formulation in accordance with the present invention, good conventionally accepted painting practices should be allowed to obtain the best results.

Metal parts treated with the novel paint-oil formulation in accordance with the method of the present invention have shown surprisingly excellent corrosion resistance relative to industry standard salt spray tests. The preferred compositions and method have exceeded the current minimum industry standard by as much as 300 percent. This represents an improvement of two to three times greater than the prior conventional methods which require two or more coating application steps.

Corrosion resistance test results indicate that corrosion resistance increases with an increase of the oil component in the di-phase formulation up to approximately 30 to 40% of the composition. Further increased beyond 50%, for example, in the percentage of the oil component in the formulation dò not appear to significantly increase corrosion resistance.

The following examples illustrate the efficiency of the present invention relative to the treated parts meeting current automotive manufacturing specifications which require painted parts to surpass a 240 hour salt spray test.

EXAMPLE I

A number of steel fastener parts were conventionally prepared by cleaning, alkaline descale, pickeled, blackened and phosphated in an essentially identical manner as used in conventional prior art processes. After a rinse and seal, the parts were dried at 220 degrees F (part temperature) for 5 to 10 minutes to remove surface water.

The parts were then cooled to ambient room temperature. Then the parts were immersed in a di-phase paint-oil composition, as described below, and subjected to a conventional dip-spin step for 15 seconds each in opposing directions. The paint-oil composition had a viscosity of 40–50 seconds #2 Zahn Cup at a temperature of 75 degrees F. The pH of the composition was adjusted to between 8.5 to 9.5 prior to immersing the parts.

After the dip-spin immersion step, the coated parts were dried at 220 degrees F for 15 minutes.

The paint-oil composition used was formulated using a conventional water based epoxy ester resin paint composition containing black pigment. Such a paint is conventional and is commercially available from Saran Protective Coating Company under the tradename SARAN BWP 9012.

The oil component used was a commercially available oil/siloxane composition sold by Ashland Petroleum Company under the trademark TECTYL 603.

The above paint and oil components were used to make a paint-oil composition comprising 50% paint, 40% oil component, and 10% water. A coating bath of this formulation was prepared and stirred to thoroughly disperse the separate paint and oil components within one another to form a substantially homogeneous temporary suspension. The metal parts referred to above were coated with this formulation by means of a conventional dip-spin technique as described above.

Next the parts were placed in a salt spray atmosphere in accordance with industry standard practices for salt spray corrosion resistance tests pursuant to ASTM Method B 117. The parts showed no signs of rust after 864 hours of exposure to the salt spray atmosphere. The current minimum specification for the automotive industry is exposure for 240 hours without showing any significant signs of visible rust.

EXAMPLE II

A set of metal parts comprising lock nuts were prepared in the same manner as described in Example I and coated with a di-phase composition employing the same steps as described in Example I. However, an aluminum pigmented paint commercially available from Jamestown Paint and Varnish Company under the tradename Jamestown 44210 was substituted for the SARAN BWP 9012 paint in the di-phase composition.

These parts were subjected to the same salt spray test conditions and showed no sign of significant rust after 1008 hours of exposure.

EXAMPLE III

Example II was repeated using a paint-oil coating formulation having 80% of the Jamestown 44210 aluminum paint and 20% of the oil component on a volume basis. The parts began to show signs of rust after 408 hours of exposure to the salt spray atmosphere.

EXAMPLE IV

Example III was repeated but used a paint-oil coating formulation having 70% of the Jamestown 44210 aluminum paint and 30% of the oil component on a volume basis. The parts did not shown signs of sufficient rust amounting to failure until 504 hours of exposure to the salt spray atmosphere.

EXAMPLE V

The steps described in Example I were repeated, however, the paint/oil formulation employed comprised a water base black pigmented alkyd paint commercially available from Jamestown Paint and Varnish Company and an oil component which included a siloxane formulation having the following composition:

| Ingredient | % by Weight |
|---|---|
| Kerosene | 90.4 |
| Varamid A7 | 1.0 |
| Dow Corning 536 | 6.0 |
| Dow Corning 531 | 2.0 |
| Oleic Acid | 0.6 |

Varamid A7 is a surfactant commercially available from Sherex Corporation.

The above siloxane formulation was blended with a water-displacing parafinic oil commercially available from Texo Corporation under the trademark GLOBRITE 364 in a ratio of 205 of the siloxane formulation to 80% of the oil on a volume basis to form the oil component.

The above oil component was added to the above black alkyd paint in a ratio of 60% paint to 40% oil to formulate the coating composition in accordance with the present invention. The parts were coated in the manner described in Example I and then were tested under the same conditions. All parts successfully passed 528 hours of salt spray exposure.

EXAMPLE VI

The steps described in Example V were repeated, however, the paint-oil formulation was changed. The paint-oil formulation included the GLOBRITE 364 oil without the siloxane formulation and consisted of 60% paint and 40% oil on a volume basis. The parts were tested and successfully passed 360 hours of salt spray exposure.

From the foregoing Examples, it should be readily apparent that the method and formulation of the present invention achieved results which surpassed the present minimum industry requirements of passing 240 hours of exposure to the salt spray atmopsphere by a factor ranging from almost two to greater than four in most instances. Further, only a single paint/oil coating application step was necessary compared to at least two and often three coating steps as employed in the prior art. For purposes of the salt spray tests conducted herein, the parts were deemed to pass such tests if not more than 3% of the surface area showed visible signs of red rust.

It is also significant to note that the baking temperature employed to cure the resin forming paint of the di-phase composition disclosed herein should not be higher than the flash point of the oil component to avoid driving the oil component phase from the surface of the cured paint coat.

The viscosity of the dispersed di-phase composition used in accordance with the present invention should be controlled to fall in the range of about 25 to 120 seconds #2 Zahn Cup at 75 degrees F. The preferred viscosity range is between about 40 to 60 seconds #2 Zahn Cup at 75 degrees F for dip-spin application.

While very good results are obtained employing a conventional dip-spin method of applying the di-phase coating of the present invention, other conventional coating methods, such as dipping, spraying or brushing, may also be used without departing from the spirit of the present invention.

Whatever method of application is employed to apply the coating, it is important to assure that the separate paint and oil component phases are well dispersed when the coating is applied. This may be accomplished by periodic mixing of the formulation to maintain a relatively homogeneous dispersion of the separate oil component phase within the paint composition. As the paint is cured, the oil phase forms a separate, evenly distributed coating layer upon the surface of the paint coat.

Further, the parts coated in accordance with the present invention do not tend to adhere to one another during the baking or drying step such as occurs in the prior art. This eliminates the need to physically separate such adhered parts and the resulting loss of the pain coat often caused during such physical separation. This is an important advantage since the creation of such small exposed metal surfaces are very detrimental to improved corrosion resistance.

It should also be pointed out that a clear or colored paint composition other than those described herein may be employed in accordance with the present invention. Such components will form a clear or colored paint film in applications wherein this is deemed desirable.

Further, in view of the discovery that paint/oil formulations in accordance with the present invention separate after simultaneous application, the present invention is not limited by the addition of other components to the oil phase which may add desirable attributes to the oil coating which is deposited upon the surface of the paint coat after the drying step has been completed.

It has been discovered that certain friction reducing additives may be added to the temporary suspension of paint/oil mixtures of the type described in a particular manner to provide a very surprising degree of reduction of the co-efficient of friction as related to torque-tension tests for threaded fasteners.

The prior art has long considered an electroplated coating of cadmium plate and an overcoat of wax on threaded fasteners as necessary to provide a desirable reduction of the co-efficient of friction such that the desired tension of the fastener can be achieved with reduced torque requirements. For several years cadmium electroplate and wax coatings have been considered the standard for achieving low levels of friction for lubricated fasteners.

However, a reduction of the co-efficient of friction, at least equal to fasteners coated with cadmium plate and wax, has been achieved employing a polytetrafluoroethylene powder dispersed uniformly in the oil phase of the oil component prior to its blending with a paint in accordance with the prior description herein.

It is well known that lubrication in the threaded area of a fastener has a substantial effect on the clamping force achieved in comparison to dry or unlubricated fasteners. Such lubrication decreases thread friction and, as a result, a higher clamping force is produced by the torque applied to the fastener. However, the type of lubricant also effects the reduction of thread friction. For many years, the industry standard for low level thread friction has been a cadmium plated coating covered by a wax, particularly as established by the automotive industry.

Development studies have shown that the polytetrafluoroethylene powder (hereinafter referred to as PTFE) which is first dispersed in the oil remains suspended in the oil phase after application and drying of the paint/oil mixture prepared in the same manner as previously described herein to provide surprisingly improved reduction of the co-efficient of friction without interfering with the improved corrosion resistance obtained by the paint/oil composition earlier described herein.

The PTFE particles are not melted, as typically used in the prior art, and appear to act as miniature ball bearings on the surface of the coated part when the part is subjected to torque-tension tests. The particles of PTFE remain suspended in the oil layer upon separation of the paint/oil composition after application and curing of the paint film layer. Therefore a very cost effective process can be employed to provide the desired reduction of the co-efficient of friction as compared to the prior art cadmium/wax process which has long been the industry standard.

The type of PTFE powders which work well in accordance with the present invention have been found to be those which have an irregular, generally ovoid shape and a size distribution within a 95% distribution limit. The average particle size is less than 3 when measured in accordance with ASTMB 330 Fisher Sub-Sieve method.

Those which have the common spherical shape tend to result in undesirable agglomeration of the PTFE particles in the oil phase. This agglomeration of PTFE particles tends to cause agglomerated lumps of PTFE particles in the applied coating which are detrimental to salt spray corrosion resistance performance. Further, such agglomeration also lessens the reduction of the co-efficient of friction in an undesirable manner as compared to the results obtain employing ovoid shaped PTFE particles.

Further, not only do the spherical shaped particles show a greater tendency to form agglomerates, these agglomerates appear to resist breaking up upon vigorous stirring or mixing of the paint/oil mixture prior to application of the coating such that a uniform distribution of the PTFE particles in the oil phase cannot be adequately re-established.

It has been found that PTFE powders available from Allied Chemical Company and sold under the name "POLYMIST FSA" and DuPont Chemical Company under the name "DLX 7000" possess the more desirable and preferred ovoid particle shape and a size distribution conducive to achieve the best results in accordance with the present invention.

The PTFE powder is first vigorously mixed in an oil component to uniformly disperse the PTFE particles within the oil phase. The oil components are those such as described earlier herein. A conventional high speed sheer disperser has been found to work well for this purpose. A suitable paint composition, will not be coupled in the oil component, as previously described herein, is then added to the oil component containing the suspended PTFE particles and thoroughly mixed to form a temporary suspension of the oil/paint mixture.

Parts coated with this mixture and dried in accordance with the previous descriptions have shown a surprising reduction of the co-efficient of friction in torque-tension tests as compared to parts coated with only an oil or the oil/paint mixtures such as disclosed earlier herein which do not include the PTFE particles.

Test results have indicated a very substantial reduction of thread friction and a corresponding increase in the clamping force achieved by the torque applied to the fasteners with as low as a five percent by weight addition of PTFE particles in accordance with the present invention. Increases in the amount of PTFE particles up to approximately twenty percent by weight have shown further decreases in the thread friction.

The latter twenty percent by weight addition of PTFE particles have exhibited friction reduction test results equal to cadmium/wax coated fasteners heretofor considered the optimum industry standard.

Further, it should be noted that the one-step process used to apply the coating employing the teachings of the present invention now provides both corrosion resistance as noted earlier herein, and a dramatic reduction of the thread friction. Therefore in accordance with the present invention, very significant cost savings can be achieved while providing an equally effective alternative to the additional processing required for the cadmium/was coat.

The following examples illustrate the practice of the present invention and the reaults achieved thereby.

EXAMPLE VII

A steel bolt and nut fastener were conventionally prepared in the same manner as described in Example I. After cooling to ambient room temperature, the parts were immersed in a paint/oil PTFE mixture, as described below, and subjected to a conventional dip-span step for approximately 15 seconds each in opposing directions.

After the dip-spin immersion step, the coated parts were dried at 220 degrees F for 15 minutes.

The coating composition used was formulated using a conventional, clear, water based, epoxy resin paint composition. Such a paint is commercially available under the tradename Japco 92884 from Jamestown Paint & Varnish Co.

The oil component used was the same as identified in Example I, sold commercially under the trademark TECTYL 603. However, prior to mixing the oil component with the paint, powdered PTFE particles were added to the oil and the mixture was blended between one-half to one hour in a conventional high speed shear disperser to thoroughly and uniformly disperse the PTFE particles in the oil. This results in a suspension of the PTFE particles in the oil. The mixture comprised 95% of the oil component and 5% of the PTFE powder on a weight basis. The PTFE powder used is a commercially available product from Allied Chemical sold under the trademark APPLIED POLYMIST F5A.

Next, the oil/PTFE mixture was added to a paint composition on a volume basis of 60 percent paint to 40 percent of the oil/PTFE mixture and stirred for one-half hour to achieve a uniform dispersion of the oil/PTFE phase in the paint. Then distilled water was added to the total mixture in an amount effective to reduce the viscosity of the mixture to between 80–90 second No. 2 Zahn Cup at 75 degrees F.

This final mixture was agitated prior to use to obtain a uniform, but temporary, suspension of the paint and oil components prior to coating of the metal parts as described above.

A standard torque test resulted in a maximum tension value of 25000 ft-lbs under the maximum torque applied to the fastener combination of 140 ft-lbs. The fasteners used in this Example VII were M14×2.0 class 10.9 hex bolts and M14x2.0 hex flanges P/T nuts on an electroplated bearing surface in accordance with standard testing procedures used in the automotive industry.

EXAMPLE VIII

The steps in Example VII were repeated, however, the oil component contained 10% by weight of PTFE powder to 90% by weight of the oil component prior to mixing the oil component with the paint.

Torque tension test on the coated fasteners resulted in a maximum tension of 26000 ft-lbs with an applied maximum torque of 135 ft-lbs.

EXAMPLE IX

The steps in Example VII were repeated, except the oil component contained 20% by weight of the PTFE powder to 80% by weight of the oil component prior to mixing the oil component with the paint.

Torque tension test on the fasteners coated with the modified mixture resulted in a maximum tension of 27000 ft-lbs with an applied torque of 120 ft-lbs.

EXAMPLE X

The steps in Example VII were repeated, except no PTFE was added to the oil. Torque tension tests on fasteners coated with this mixture containing no PTFE powder resulted in maximum tension of only 21000 ft-lbs with an applied torque of 168 ft-lbs.

Other tests were made in the same manner as Example VII except PTFE powder particles obtained commercially from DuPont Chemical Company and sold commercially under the trademark DUPONT DLX 7000 were substituted for the PTFE powder identified in Examples VII, VIII and IX. The results of tests on these parts were essentially identical to that obtained in Examples VII, VIII and IX.

It is believed that other paint and oil formulations such as disclosed in Examples I thru VI would also provide similar results as compared to the formulation described in Examples VII through IX when PTFE powder is added in accordance to the teachings herein.

With respect to Example IX, these test results indicate a functional equivalency to fasteners having a cadmium/wax coat yet may be processed in accordance with the present invention using a single coating step at significant savings in processing costs.

The torque-tension results indicate that the oil/PTFE powder/paint mixture of the present invention reduces the torque requirements to achieve maximum tension by a surprisingly substantial margin.

A comparison of Examples IX and X show a very dramatic increase in maximum tension obtained relative to the maximum torque required.

Such results are particularly dramatic when the time and cost savings are considered as compared to the prior art cadmium/wax process. A further advantage of the present invention is that the oil/PTFE/paint coating is far less toxic as compared to cadmium plated fasteners.

In view of the foregoing description it should be readily appreciated by those skilled in the art that the present invention represents a novel and very substantial step forward to the corrosion resistance and friction reduction processing of metal fasteners. It is also pointed out that the studies and tests conducted in the development of the present invention indicate that the PTFE powders in the solid phase as dispersed in the oil phase provide friction reduction to a highly surprising degree. Additionally, it is noted that it was found to be important that the PTFE powders be capable of being suspended within the oil phase without significant agglomeration of the particles such that upon separation of the oil and paint phases after curing, the oil containing the PTFE particles forms a relatively uniform, distinct layer over the cured paint film with the PTFE particles substantially uniformly dispersed throughout the oil layer.

What is claimed is:

1. A coating composition for application to metal parts to improve corrosion resistance and reduce surface friction comprising, in combination a mixture of; (1) a resin film forming paint component; (2) an oil component nonsoluble in said paint component and uniformly dispersed in said paint component to form a temporary suspension; (3) a friction reducing agent in the form of an effective amount of powdered PTFE particles suspended in said oil component; wherein said mixture is characterized by its ability to form two distinct coating layers having said oil component containing said suspended PTFE particles distributed over the surface of a cured layer of said paint component.

2. The coating composition defined in claim 1 wherein said polytetrafluroethylene particles are ovoid in shape.

3. The coating composition defined in claim 1 wherein the amount of said polytetrafluroethylene particles suspended in said oil component range between 5 and 20 percent by weight based on the oil and polytetrafluoroethelene mixture.

4. A coating composition for application to the surface of a metal part to improve corrosion resistance and to reduce the co-efficient of friction of the coated surface comprising, in combination; a semi-stable mixture of (1) a resin film forming paint component; (2) a liquid oil component, non-soluble in said paint component and dispersed in said paint component to form a temporary suspension; wherein said oil component includes a friction reducing agent in the form of an effective amount of polytetrafluoroethylene solid particles suspended within said oil component.

5. The coating composition defined in claim 4 wherein said polytetrafluoroethelene particles are ovoid in shape.

6. The coating composition defined in claim 4 wherein the amount of said polytetrafluoroethylene particles suspended in said oil component is no less than about 5 percent by weight based on the oil and polytetrafluoroethylene mixture.

7. A method of applying a single liquid mixture to metal parts to form a two layered coating on said parts to improve corrosion resistance and reduce surface friction when the coating is cured, comprising the steps of: (1) mixing an oil component containing an effective amount of solid polytetrafluoroethylene particles suspended therein with a resin film forming paint component to form a semi-stable liquid suspension of said oil and paint components, the components being mixed on a volume basis in a ratio of about 30 to 50% oil component to about 50 to 70% resin film forming component; (2) applying a single coating of the liquid mixture formed in step 1 to a metal part; and (3) curing the single coating of said liquid suspension applied in step 2 to form two layers on said metal part with a layer of resin film adhered to the surface of said part and an oil layer having the polytetrafluoroethylene suspended therein overlying the resin film layer.

8. The method defined in claim 7 wherein said polytetrafluoroethelene particles are ovoid in shape.

9. The method defined in claim 7 wherein the amount of polytetrafluoroethylene particles in said oil component is no less than about 5% by weight of the oil component.

* * * * *